United States Patent [19]
Reid et al.

[11] Patent Number: 5,711,196
[45] Date of Patent: Jan. 27, 1998

[54] TOOLING APPARATUS AND METHODOLOGY FOR MACHINING A BLANK HAVING MULTIPLE SPIN CENTERS

[75] Inventors: John Reid, Wasaga Beach; Conrad Stenton, Midland, both of Canada

[73] Assignee: Hughes Electronics, Los Angeles, Calif.

[21] Appl. No.: 638,004

[22] Filed: Apr. 25, 1996

[51] Int. Cl.$^6$ .............................. B23B 1/00; B23B 31/36; B24B 41/06

[52] U.S. Cl. .................... 82/1.11; 82/15; 82/165; 279/6; 279/130; 451/384; 451/390

[58] Field of Search .................. 82/12, 15, 165, 82/167, 168, 1.11; 279/6, 130; 451/384, 385, 390, 400

[56] References Cited

U.S. PATENT DOCUMENTS

| | | | |
|---|---|---|---|
| 3,962,833 | 6/1976 | Johnson | 451/390 |
| 4,709,512 | 12/1987 | Okobo et al. | 451/375 |
| 5,320,007 | 6/1994 | Weirauch | 82/165 |

FOREIGN PATENT DOCUMENTS

| | | | |
|---|---|---|---|
| 0220244 | 3/1985 | Germany | 82/165 |

*Primary Examiner*—Steven C. Bishop
*Attorney, Agent, or Firm*—Gordon R. Lindeen, III; Michael W. Sales; Wanda K. Denson-Low

[57] ABSTRACT

A tooling apparatus and method for machining a blank having a first surface portion with a first spin center and a second surface portion with a second spin center offset from the first spin center. The improved tooling apparatus includes a turning fixture connectable to a rotatable spindle in one of a first position and a second position. The first spin center of the blank aligns with the axis of rotation of the spindle when the turning fixture is in its first position and the second spin center of the blank aligns with the axis of rotation when the turning fixture is in its second position. In the preferred embodiment, the rotatable spindle includes a dowel cooperative with first and second bores formed in the turning fixture to position the turning fixture relative to the spindle. The first and second bores are separated a distance equal to the distance between the first spin center and the second spin center of the blank. The method for machining the blank includes the steps of connecting the blank to the turning fixture, coupling the turning fixture in its first position for rotation with the spindle, machining the first surface portion, relocating and connecting the turning fixture in its second position for rotation with the spindle, and machining the second surface portion of the blank.

18 Claims, 3 Drawing Sheets

TOOLING APPARATUS AND METHODOLOGY FOR MACHINING A BLANK HAVING MULTIPLE SPIN CENTERS

BACKGROUND OF THE INVENTION

1. Technical Field

The present invention relates generally to a tooling apparatus for machining a blank and, more particularly, to a tooling apparatus for machining a blank having first and second machined surfaces with first and second spin centers, respectively, offset from one another a predetermined distance.

2. Discussion

Traditionally, a tooling apparatus used to machine blanks includes a rotatable spindle to which the blank is removably coupled for machining. A cutting tool is used to remove excess material from the blank in order to provide a finished product within the required tolerances. Often times, the blank is comprised of either a single surface or multiple surfaces having a single spin axis. In these instances, the blank may be machined in a single tooling set-up, that is, without moving the blank relative to the spindle. With increasing regularity, however, tooled or machined blanks include multiple components or surfaces having more than one spin axis. In these situations, the blank must be repositioned on the spindle or placed upon a different tooling apparatus between the machining of the separate components.

One environment where machining is commonly used as a finishing step is in the manufacture of optics used to reflect or refract light. Optics are currently manufactured by, among other techniques, machining an optic material such as glass or machining a substrate that is then coated with a reflective material to create a mirror. Optics generally are manufactured for mounting to another body and therefore require a mounting apparatus or mounting surface integral with the body of the optic. As with other tooled blanks, an optic having multiple surfaces can be machined in a single tooling set-up when the optical axis, i.e., the axis about which the optic material is rotated to form the convex or concave optical surface, is at the same location as the spin center of the mounting apparatus.

However, in many applications, the optical axis is offset from the spin center of the mounting apparatus thereby requiring separate tooling set-ups to machine the respective surfaces. Just as with other multiple surfaced blanks, these optics are commonly machined by connecting the optic material to a first turning fixture and spindle whereupon one of either the optic surface or the mounting apparatus is machined. The optic is then connected to a second tooling fixture and spindle for machining the remaining optic surface or mounting apparatus. While this method of machining the separate surfaces of a blank has been generally effective at producing optics within the required tolerances, moving the optic between machining steps increases the potential for error.

The position and orientation of the optical axis relative to the mounting surface of an optic is important to the effective operation of the optic. In many applications it is required that the mounting surface be perpendicular to the optical axis. However, the required tolerances related to this perpendicularity is often not achieved when the blank is moved between machining steps. Accordingly, a continuing need exists to provide a tooling apparatus and method for making machined products with multiple spin axes within required tolerances and, particularly, for machining optics wherein the potential for losing the perpendicularity of the optical axis relative to the mounting interface is minimized.

SUMMARY OF THE INVENTION

The present invention provides a tooling apparatus for machining a blank having first and second surface portions with first and second spin centers, respectively, offset from one another a predetermined distance. The apparatus includes a turning fixture to which the blank is connected for rotation and a spindle having a rotational axis. The tooling apparatus further includes locating means for selectively positioning the turning fixture in one of a first position and second position relative to the spindle and connecting means for securing the turning fixture for rotation with the spindle. The tooling apparatus provides that when the turning fixture is in its first position the first spin center of the blank aligns with the rotational axis of the spindle whereas when the turning fixture is in its second position the second spin center of the blank aligns with the rotational axis of the spindle.

The method disclosed and claimed herein for making the blank includes the steps of connecting the blank for rotation with the turning fixture and connecting the turning fixture in its first position relative to the spindle for rotation therewith. The first blank surface is then machined and the turning fixture is repositioned into its second position relative to the spindle. Finally, the turning fixture is coupled for rotation with the spindle, the spindle is rotated, and the second surface of the blank is machined.

BRIEF DESCRIPTION OF THE DRAWINGS

Other objects and advantages of the invention will become apparent upon reading the following detailed description and upon reference to the drawings, in which.

DETAILED DESCRIPTION OF THE PREFERRED EMBODIMENT

The following description of the preferred embodiments of the present invention is merely exemplary in nature and is not intended to limit the scope of the claimed invention. Moreover, the following description, while depicting the invention in an environment specifically relating to the machining of a substrate for a mirror, is intended to adequately teach one skilled in the art to make and use the tooling apparatus and method described herein to produce a variety of machined products. Specifically, those skilled in the art will appreciate that the tooling apparatus 10 described and claimed herein is applicable to many machining tasks wherein the workpiece requires multiple tooling setups.

Figure 1:
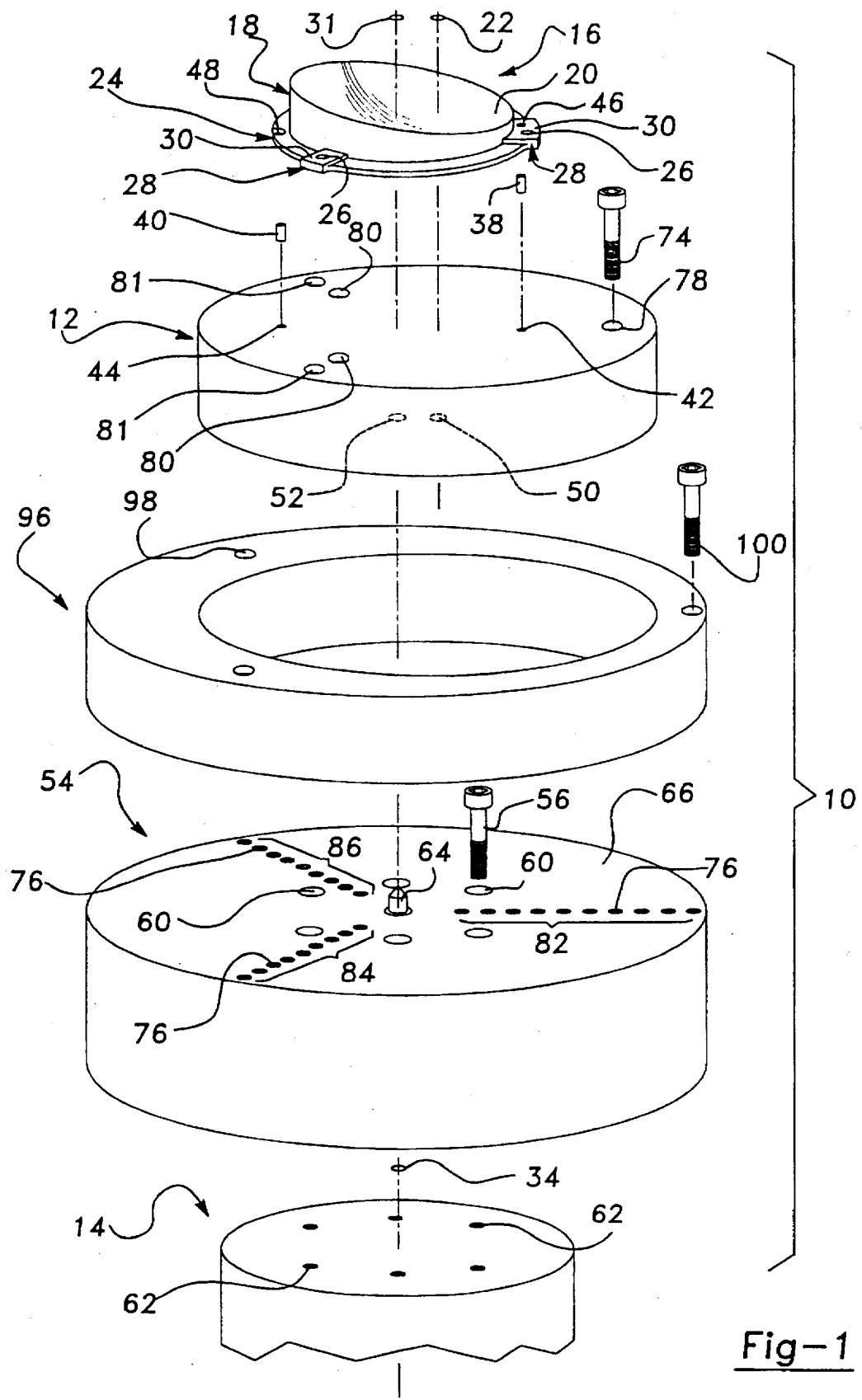
FIG. 1 is an exploded perspective of the tooling apparatus in accordance with the present invention.

As illustrated in FIG. 1 of the drawings, a tooling apparatus 10 is generally shown to include a turning fixture 12 connectable for rotation with a rotatable spindle 14. A workpiece, shown as a blank 16, having multiple surfaces with offset spin centers is in turn connected for rotation with fixture 12 and spindle 14. Specifically, in the preferred embodiment, blank 16 is shown to include a first portion 18 having an optical surface 20 with an optical axis 22 and a second portion 24 including a mounting structure such as a plurality of mounting pads 28 each with a mounting surface 30. Mounting pads 28 are preferably circumferentially spaced about blank 16 and located a constant radial distance from a spin center 31. Spin center 31 is offset from optical axis 22 by a predetermined distance. In the preferred embodiment, mounting pads 28 are provided with mounting apertures 26 used to secure blank 16 to another body. Those skilled in the art will appreciate that while the present invention is described with respect to a blank having only two offset spin centers, the novel tooling apparatus can easily be modified to allow accurate machining of blanks having components with more than two offset spin centers.

The present invention provides for the machining of the various surfaces of blank 16 without removing and relocating blank 16 relative to turning fixture 12. Specifically, spindle 14 includes an axis of rotation 34 relative to which turning fixture 12 is positionable in either a first position (FIGS. 2 and 3) wherein optical axis 22 aligns with an axis of rotation 34 of spindle 14 or a second position (FIGS. 1, 4, and 5) wherein mounting structure spin center 31 aligns with axis of rotation 34. As is further discussed in greater detail hereinafter, the present invention provides for the repositioning of blank 16 relative to spindle 14 through the movement of turning fixture 12. Accordingly, blank 16 remains fixed relative to turning fixture 12 throughout the machining process.

Tooling apparatus 10 includes blank locating means for properly positioning blank 16 relative to turning fixture 12. In the preferred embodiment, the blank locating means includes first and second guide pins 38 and 40, respectively, cooperative blind holes 42 and 44, respectively, formed in turning fixture 12, and apertures 46 and 48, respectively, defined in second portion 24 of blank 16. Blind holes 42 and 44 are positioned in turning fixture 12 so that optical axis 22 and mounting surface spin center 31 of blank 16 align with a first and a second dowel bore 50 and 52, respectively, formed in turning fixture 12.

Once properly positioned, blank 16 is secured to turning fixture 12 for rotation therewith by coupling means known in the art. In order to minimize the stresses created in blank 16 and/or turning fixture 12, it is preferred that an epoxy or equivalent adhesive be used to couple blank 16 to turning fixture 12.

As previously discussed, turning fixture 12 may be selectively positioned relative to, and coupled for rotation with, spindle 14. Accordingly, tooling apparatus 10 further includes fixture locating means for selectively positioning turning fixture 12 in its first or second position relative to spindle 14 and fixture connecting means for securing turning fixture 12 for rotation with spindle 14. In the preferred embodiment of the present invention, a chuck 54 operates as a component of both the fixture locating and connecting means. Specifically, chuck 54 is removably secured to spindle 14 via a plurality of cap screws 56 that cooperate with a plurality of countersunk bores 60 formed in chuck 54 and threadably engage a plurality of threaded bores 62 formed in spindle 14.

Figure 2:
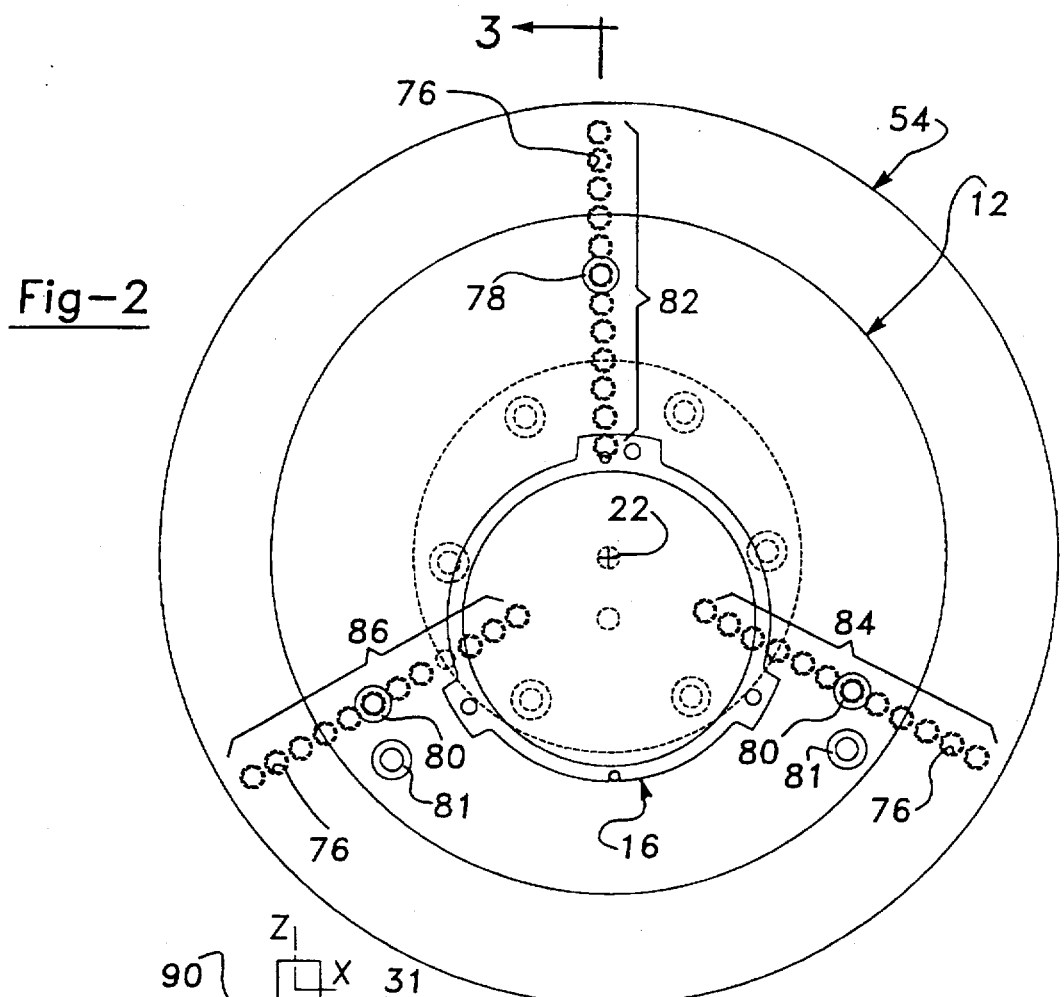
FIG. 2 is a top view of the tooling apparatus positioned for machining the optical surface of the blank.
Figure 3:
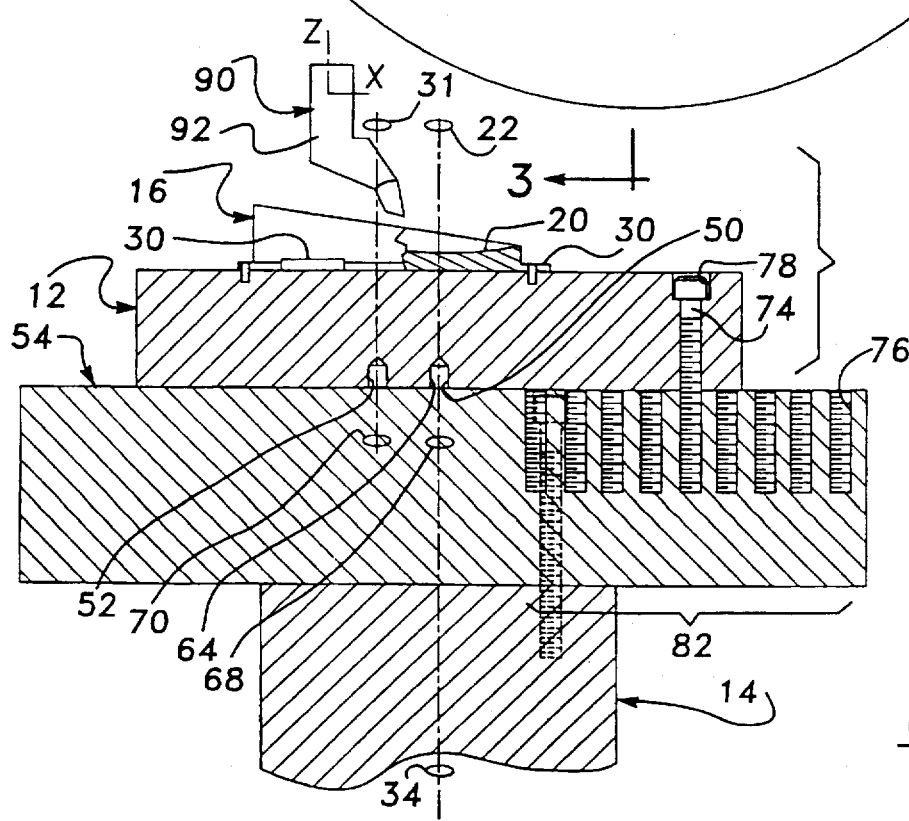
FIG. 3 is a sectional view taken along the lines 3—3 of FIG. 2.

The preferred fixture locating means shown in the drawings include a dowel 64 formed on an upper surface 66 of chuck 54. Dowel 64 extends along axis of rotation 34 when chuck 54 is secured to spindle 14. As will be discussed in greater detail hereinafter, dowel 64 is disposable within the first and second dowel bores 50 and 52, respectively, formed in turning fixture 12. As best seen in FIGS. 3 and 5, respectively, first bore 50 has a longitudinal axis 68 aligned with optical axis 22 of blank 16 and second bore 52 has a longitudinal axis 70 aligned with mounting surface spin center 31. As a result, the fixture locating means, including dowel 64 and bores 50 and 52, allows turning fixture 12 and, accordingly, blank 16 to be selectively positioned relative to spindle 14 in either a first position (FIGS. 2 and 3), wherein optical axis 22 of blank 16 aligns with rotational axis 34 of spindle 14, or a second position (FIGS. 1, 4, and 5), wherein mounting surface spin center 31 aligns with rotational axis 34 of spindle 14. By this arrangement, optical surface 20 and mounting surfaces 30 of blank 16 may each be machined by sequentially positioning turning fixture 12 in its first and second positions relative to spindle 14 rather than removing and repositioning blank 16 relative to turning fixture 12.

Again referring to FIG. 1 of the drawings, turning fixture 12 also includes a plurality of countersunk bores sized to cooperate with cap screws 74 and threaded bores 76 in chuck 54 to form the fixture connecting means. Specifically, in the preferred embodiment, turning fixture 12 includes five countersunk bores including a first bore 78 that cooperates with a pair of second bores 80 to form a first set of countersunk bores usable to secure turning fixture 12 in its first position relative to spindle 14 (FIG. 2). Similarly, first bore 78 cooperates with a pair of third bores 81 to form a second set of countersunk bores for securing turning fixture 12 in its second position relative to spindle 14 (FIG. 4).

Figure 4:
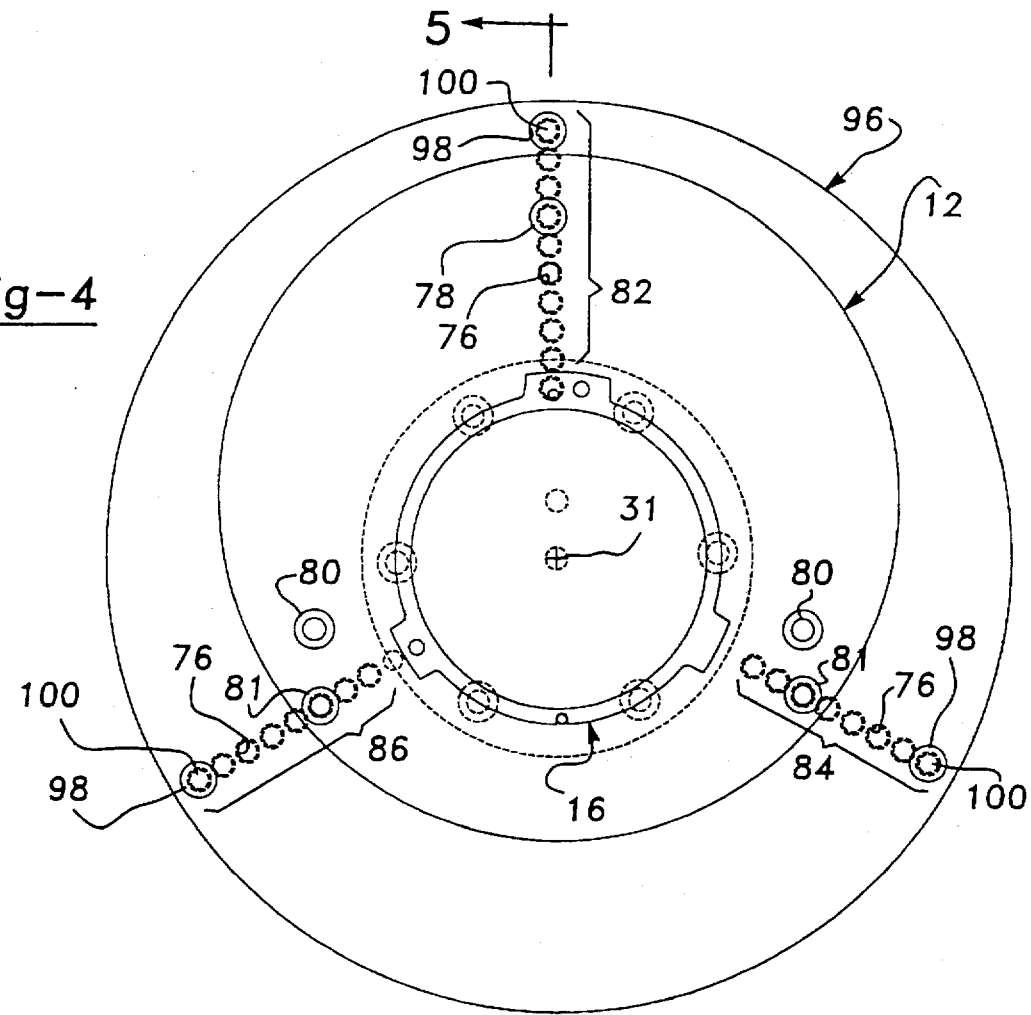
FIG. 4 is a top view of the tooling apparatus positioned for machining the mounting surfaces of the blank.
Figure 5:
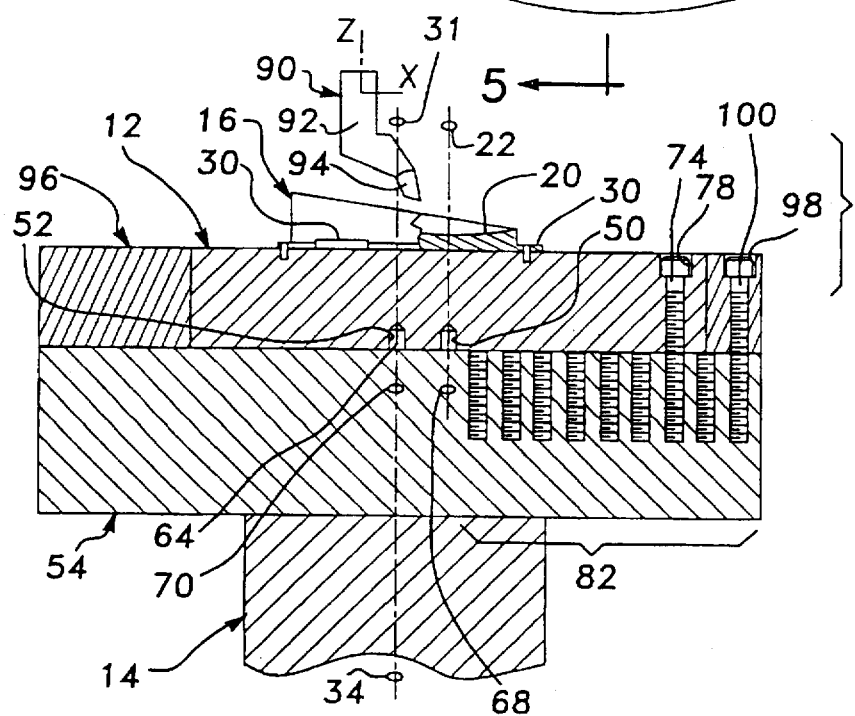
FIG. 5 is a sectional view taken along the lines 5—5 of FIG. 4.

As best seen in FIGS. 1, 2, and 4, the plurality of threaded bores 76 formed on chuck 54 are arranged to form three sets of linear threaded bore segments 82, 84, and 86, respectively, each separated by a constant angular space. The individual threaded bores 76 are radially spaced along their respective radial segment to provide an array of threaded bores through which turning fixture 12 may be secured to chuck 54 and spindle 14. Cap screws 74 cooperate with countersunk bores 78, 80, and 81 and selected threaded bores 76 to secure turning fixture 12 to chuck 54 for rotation with spindle 14.

While the cap screw and bore arrangements illustrated and discussed herein provide the preferred structure for securing the turning fixture for rotation with the spindle, those skilled in the art will appreciate that other equivalent connecting means may be used without departing from the scope of the claimed invention.

It should also be appreciated by those skilled in the art that once blank 16 has been connected to turning fixture 12, the multiple surfaces of blank 16, i.e., optical surface 20 and mounting surface 30, can each be sequentially machined by moving turning fixture 12 relative to spindle 14 rather than blank 16 relative to turning fixture 12. Further, while it is contemplated that the spindle 14 and chuck 54 described herein may be used to machine blanks of various geometries, turning fixture 12 is preferably specifically manufactured for each type of blank 16.

FIGS. 2 and 3 illustrate the tooling apparatus 10 wherein the turning fixture 12 is in its first position relative to spindle 14 for machining optical surface 20 of blank 16. As best seen in FIG. 3, and as previously described, dowel 64 and first bore 50 cooperate to locate turning fixture 12 in its first position relative to spindle 14. In this position, optical axis 22 of optical surface 20 aligns with rotational axis 34 of spindle 14. Threaded cap screws 74 cooperate with threaded bores 76 and the first set of countersunk bores 78 and 80 formed on turning fixture 12 to secure turning fixture 12 for rotation with spindle 14.

As shown in FIG. 3, a cutting tool 90 is positioned relative to tooling apparatus 10 in order to remove the desired material from blank 16. It will be appreciated that when tooling apparatus 10 is used to machine substrates for mirrors, blank 16 typically has been finish machined to require the removal of only a thin layer of material. For example, in one operation contemplated by the Applicants, the substrate layer removed through the use of the tooling apparatus disclosed and claimed herein is approximately 0.004 inches in depth.

It is preferred that while spindle 14, chuck 54, turning fixture 12, and blank 16 rotate about rotational axis 34, cutting tool 90 is moveable only in the x and/or y and z direction. The preferred geometry and composition of the cutting tool depends upon the specific application of the novel tooling apparatus and, particularly, to the material and finish quality of the workpiece or blank 16 being machined. In the preferred embodiment, and as shown in FIGS. 3 and 5, cutting tooling 90 includes a body portion 92 and a diamond cutting tip 94.

After the desired layer has been removed from optical surface 20, turning fixture 12 is repositioned into its second position relative to spindle 14 to allow machining of the mounting surfaces 30. Accordingly, each of the three cap screws 74 are removed from engagement with threaded bores 76 and the first set of countersunk bores 78 and 80, and turning fixture 12 is repositioned relative to chuck 54 and spindle 14 such that dowel 64 is disposed within second turning fixture bore 52. In this position, as illustrated in FIGS. 4 and 5, mounting surface spin center 31 aligns with rotational axis 34 of spindle 14. The second set of countersunk bores 78 and 81 formed in turning fixture 12 cooperate with cap screws 74 to removably connect turning fixture 12 to chuck 54.

As further illustrated in FIGS. 1, 4, and 5, a counterbalance 96 is shown connected for rotation with chuck 54 when turning fixture 12 is in its second position. As will be appreciated by those skilled in art, counterbalance 96 is included in tooling apparatus 10 when, absent counterbalance 96, the rotational mass of tooling apparatus 10 would be undesirably offset from rotational axis 34. Counterbalance 96 includes a plurality of countersunk bores 98 cooperative with cap screws 100 to connect counterbalance 96 to threaded bores 76 of chuck 54 for rotation therewith. It should be appreciated that a counterbalance can be included in tooling apparatus 10 for all or none of the specific tooling set-ups without departing from the scope of the claimed invention.

Again, the machining of blank 16 is performed by rotating spindle 14 about rotational axis 34 and reciprocating cutting tool 90 in the x and/or y and z directions as needed to remove the desired material from mounting surfaces 30.

In addition to the novel tooling apparatus disclosed and claimed herein, a corresponding method for machining a blank having a first surface with a first spin center and a second surface with a second spin center offset from the first spin center is disclosed and claimed. Specifically, performance of the novel method includes connecting blank 16 for rotation with turning fixture 12. As previously described, the preferred means for locating blank 16 on turning fixture 12 includes guide pins 38 and 40, cooperatively sized apertures 46 and 48, and blind holes 42 and 44. Once properly positioned, blank 16 is connected for rotation with turning fixture 12 preferably by an adhesive such as an epoxy.

Turning fixture 12 is then connected for rotation with spindle 14 so that the first spin center of blank 16, i.e., optical axis 22, aligns with rotational axis 34. In the preferred embodiment, chuck 54 is coupled to spindle 14 in order to locate turning fixture 12 relative to spindle 14 and secure turning fixture 12 thereto. Specifically, cap screws 56 cooperate with countersunk bores 60 formed in chuck 54 and threaded bores 62 in spindle 14 to connect chuck 54 for rotation with spindle 14. Turning fixture 12 is then placed in its first position relative to spindle 14 by disposing dowel 64 on chuck 54 within first bore 50 of turning fixture 12. A plurality of cap screws 74 cooperate with countersunk bores 78 and 80 and threaded bores 76 to secure turning fixture 12 to chuck 54 and spindle 14 for rotation therewith thereby ensuring that the first spin center of first surface 20 remains in alignment with axis of rotation 34. Spindle 14 is then rotated about axis 34 and cutting tool 90 is used to remove the desired material from first surface 20.

In order to machine mounting surfaces 30 of blank 16, turning fixture 12 is repositioned relative to spindle 14 and chuck 54 such that second spin center 31 aligns with rotational axis 34. The proper position is ensured by placing dowel 64 within second bore 52 of turning fixture 12. Cap screws 74 again secure turning fixture 12 to chuck 54 for rotation therewith. The spindle is rotated about rotational axis 34 and cutting tool 90 is reciprocated so as to remove the desired material from mounting surfaces 30. It should be appreciated that the additional step of securing a counterbalance 96 to chuck 54, as previously described, for rotation therewith may be performed as needed.

Various other advantages of the present invention will become apparent to those skilled in the art after having the benefit of studying the foregoing text and drawings, taken in conjunction with the following claims.

What is claimed is:

1. A tooling apparatus for machining a blank having a first surface portion with a first spin center and a second surface portion with a second spin center offset from said first spin center, said tooling apparatus comprising:

a spindle having a rotational axis;

a turning fixture;

coupling means for connecting the blank for rotation with said turning fixture;

locating means for selectively positioning said turning fixture in one of a first position and a second position relative to said spindle, the first spin center of the blank aligning with said rotational axis of said spindle when said turning fixture is in said first position, the second spin center of the blank aligning with said rotational axis of said spindle when said turning fixture is in said second position;

connecting means for securing said turning fixture for rotation with said spindle; and a counterbalance coupled for rotation with said turning fixture when said turning fixture is in said second position, said counterbalance aligning a center of rotation of the combined turning fixture and counterbalance with the rotational axis of said spindle.

2. The tooling apparatus of claim 1 wherein said counterbalance includes a ring circumscribing said turning fixture.

3. The tooling apparatus of claim 1, wherein said locating means includes a dowel connected to said spindle and first and second bores formed in said turning fixture, said dowel being disposed in said first bore when said turning fixture is in said first position, said dowel being disposed in said second bore when said turning fixture is in said second position.

4. The tooling apparatus of claim 3, wherein said dowel has a longitudinal axis aligned with the rotational axis of said spindle.

5. The tooling apparatus of claim 1, further including a chuck connected for rotation with said spindle, said locating means including a dowel protruding from said chuck and first and second bores formed in said turning fixture, said dowel being disposed in said first bore when said turning fixture is in said first position, said dowel being disposed in said second bore when said turning fixture is in said second position.

6. The tooling apparatus of claim 5, wherein said connecting means includes a plurality of cap screws, first and second sets of countersunk bores formed in said turning fixture, and a plurality of threaded bores formed in said chuck, said plurality of cap screws being disposed in said first set of countersunk bores and threadably engaging said threaded bores formed in said chuck to secure said turning fixture to said chuck for rotation with said spindle when said turning fixture is in said first position, said plurality of cap screws being disposed in said second set of countersunk bores and threadably engaging said threaded bores formed in said chuck to secure said turning fixture to said chuck for rotation with said spindle when said turning fixture is in said second position.

7. The tooling apparatus of claim 1, wherein said coupling means for connecting the blank for rotation with said turning fixture consists of an adhesive material.

8. The tooling apparatus of claim 7, wherein said adhesive material is an epoxy.

9. The tooling apparatus of claim 1, further including second locating means for positioning the blank relative to said turning fixture.

10. A tooling apparatus for machining an optical member having an optical surface with an optical axis and a mounting structure with a spin center offset from said optical axis, said tooling apparatus comprising:

a spindle having a rotational axis;

a turning fixture;

coupling means for connecting the optical member for rotation with said turning fixture;

locating means for selectively positioning said turning fixture in one of a first position and a second position relative to said spindle, the optical axis aligning with said rotational axis of said spindle when said turning fixture is in said first position, the spin center of the mounting structure aligning with said rotational axis of said spindle when said turning fixture is in said second position;

connecting means for securing said turning fixture for rotation with said spindle; and a counterbalance coupled for rotation with said turning fixture when said turning fixture is in said second position, said counterbalance aligning a center of rotation of the combined turning fixture and counterbalance with the rotational axis of said spindle.

11. The tooling apparatus of claim 10, wherein said locating means includes a dowel protruding from said spindle and first and second bores formed in said turning fixture, said dowel being disposed in said first bore when said turning fixture is in said first position, said dowel being disposed in said second bore when said turning fixture is in said second position.

12. The tooling apparatus of claim 11, wherein said dowel has a longitudinal axis aligned with the rotational axis of said spindle.

13. The tooling apparatus of claim 10, further including a chuck connected for rotation with said spindle, said locating means including a dowel protruding from said chuck and first and second bores formed in said turning fixture, said dowel being disposed in said first bore when said turning fixture is in said first position, said dowel being disposed in said second bore when said turning fixture is in said second position.

14. The tooling apparatus of claim 13, wherein said connecting means includes a plurality of cap screws, first and second sets of countersunk bores formed in said turning fixture, and a plurality of threaded bores formed in said chuck, said plurality of cap screws being disposed in said first set of countersunk bores and threadably engaging said threaded bores formed in said chuck to secure said turning fixture to said chuck for rotation with said spindle when said turning fixture is in said first position, said plurality of cap screws being disposed in said second set of countersunk bores and threadably engaging said threaded bores formed in said chuck to secure said turning fixture to said chuck for rotation with said spindle when said turning fixture is in said second position.

15. The tooling apparatus of claim 10, wherein said coupling means for connecting the optical member for rotation with said turning fixture consists of an adhesive material.

16. The tooling apparatus of claim 10, further including second locating means for positioning the optical member relative to said turning fixture.

17. A method for machining a blank having a first surface portion with a first spin center and a second surface portion with a second spin center offset from the first spin center, said method comprising the steps of:

a) connecting the blank to a turning fixture;

b) connecting said turning fixture for rotation with a spindle in a first position where the first spin center of the blank aligns with a rotational axis of said spindle;

c) rotating said spindle;

d) removing material from the blank to form the first surface portion;

e) connecting said turning fixture for rotation with said spindle in a second position where the second spin center of the blank aligns with said rotational axis of said spindle;

f) connecting a counterbalance for rotation with said turning fixture when said turning fixture is in said second position whereby a center of rotation of the combined turning fixture and counterbalance aligns with the rotational axis of the spindle;

(g) rotating said spindle; and (h) removing material from the blank to form the second surface portion.

18. The method as set forth in claim 17 further including a dowel connected to said spindle, wherein said turning fixture includes a first bore and a second bore, wherein the step of connecting said turning fixture for rotation with the spindle so that the first spin center of the blank aligns with the rotational axis of said spindle includes disposing said dowel in said first bore, and wherein the step of connecting said turning fixture for rotation with said spindle so that the second spin center of the blank aligns with said rotational axis of said spindle includes disposing said dowel in said second bore.

* * * * *